Nov. 27, 1962   B. G. PRICE ET AL   3,066,254
MOUNTING EQUIPMENT FOR SCANNING TUBULAR GOODS
Filed Nov. 13, 1959   7 Sheets-Sheet 1

Fig. 1A

Berry Glenn Price
Eugene A. Placke
INVENTORS

BY Tom Arnold
G C Helmey
ATTORNEY

Nov. 27, 1962  B. G. PRICE ET AL  3,066,254
MOUNTING EQUIPMENT FOR SCANNING TUBULAR GOODS
Filed Nov. 13, 1959  7 Sheets-Sheet 2

Fig. 1B

Berry Glenn Price
Eugene A. Placke
INVENTORS

BY Tom Arnold
G C Helmig
ATTORNEY

Berry Glenn Price
Eugene A. Placke
INVENTORS

BY Tom Arnold
BC Helmig
ATTORNEY

United States Patent Office 3,066,254
Patented Nov. 27, 1962

3,066,254
MOUNTING EQUIPMENT FOR SCANNING TUBULAR GOODS
Berry Glenn Price and Eugene A. Placke, Houston, Tex., assignors to Tuboscope Company, Houston, Tex., a corporation of Delaware
Filed Nov. 13, 1959, Ser. No. 852,768
16 Claims. (Cl. 324—37)

This invention has to do with the performance of work on tubular goods and more particularly to improved equipment to embrace and operate on ferrous metal tubing during relative travel in the longitudinal direction of the tubing axis. In a preferred embodiment, the invention is concerned with a tube receiving annular chassis or frame for mounting wall testing and/or cleaning components to act during tube passage therethrough and which mounting frame is itself flexibly or loosely supported for free movements of translation in all lateral directions with respect to longitudinal tubing travel and has tubing engageable follower guides for maintaining a centered relation between the tubing and the frame carried components which operate on the tubing and compelling the floating frame to participate in lateral tubing displacement under whipping, vibratory and other side directed forces.

It is an object of the invention to provide a floating frame assembly having work performing devices inclusive of wall conditioning scrapers and surface and thickness testers together with tube engaging frame centering followers to transfer lateral pipe movements to the frame and maintain the work performing devices in proper operating relation with the pipe at all times.

A further object of the invention is to provide an improved tube working machine whose component units are mounted in a laterally shiftable frame and are provided in at least certain instances with tube engaging parts and which parts, as well as the frame centralizing followers, comprise groups of tubing bearing members circularly spaced apart in each group and in tube embracing relation and mounted by the frame to be inwardly yieldably biased for relative contraction against the tube periphery and capable of expansion in compensation for and to accommodate passage of coupling collars or other external enlargements on the traveling tubing while maintaining crowded fitment thereto.

Another object of the invention is to provide a tubing testing machine which combines in the same frame a surface flaw electromagnetic detector including expansible pickup shoes for co-operation with the tube surface and a power driven rotor carrying a gamma ray source and detector arranged to measure tubing wall thickness during relative longitudinal travel between the frame and the tubing being tested.

A further object of the invention is to provide an improved adjustable mounting and drive transmission for a rotatable carriage by which gamma ray equipment is spun for traversing a tubing wall during a thickness measuring operation.

Other objects and advantages will become apparent during the course of the following specification having reference to the accompanying drawings wherein.

While not limited in usage, the equipment shown has been designed to meet tubing problems arising in the petroleum producing, transporting and well drilling industry. It is especially desirable to inspect tubular goods such as well drill pipe, casing and flow tubing for defects, breaks and incipient failure as indicated by surface flaws, cracks and wall thinness and such examination can be quickly and economically performed on racked pipe prior to installation in the well and by moving the pipe through inspection equipment in a horizontal path, as illustrated in the drawings. The inspection is to be made on new tubing and also on tubing which previously had been in use and removed from a well and racked for reuse.

Use of the equipment is not confined to yard inspection nor to horizontal travel. Thus inspection can be on tubular goods being removed from a well. Such removal involves raising above the surface a string of end to end connected pipe and breaking it into stands of two or more joints for temporary storage at one side. For inspection at the well head while the pipe is being raised, the equipment illustrated in the drawings will be placed on a vertical axis aligned with the well hole for pipe elevation therethrough.

For facilitating operation and maintenance of the inspection equipment and for conditioning the pipe for handling and later reinstallation, a dirty pipe surface should be cleaned by the removal of paraffin, drilling mud and other foreign matter and a pipe scraper device is here provided for co-operation with the inspection apparatus by advance preparatory action on the pipe.

Whether the longitudinal machine axis is positioned vertically at a well or horizontally in a yard or shop installation, long lengths of tubing, by reason of travel and inherent flexibility, will often tend to whip and bend or otherwise be subject to deflection forces to cause lateral displacement of the tubing axis on passage through the machine. Additionally, long tubing strings will lack true end to end straightness, and to maintain proper working relation between the operating components and that portion of the traveling tubing being operated upon, the main frame for the operating components is flexibly and floatably supported and provided with tubing engageable guide followers for the transmission of lateral forces and bodily movement from the tubing to the floating frame and components in all lateral directions so that a centralized relation exists at all times and the frame is constrained to follow lateral vibration or other bodily sidewise displacements.

Figure 1A:
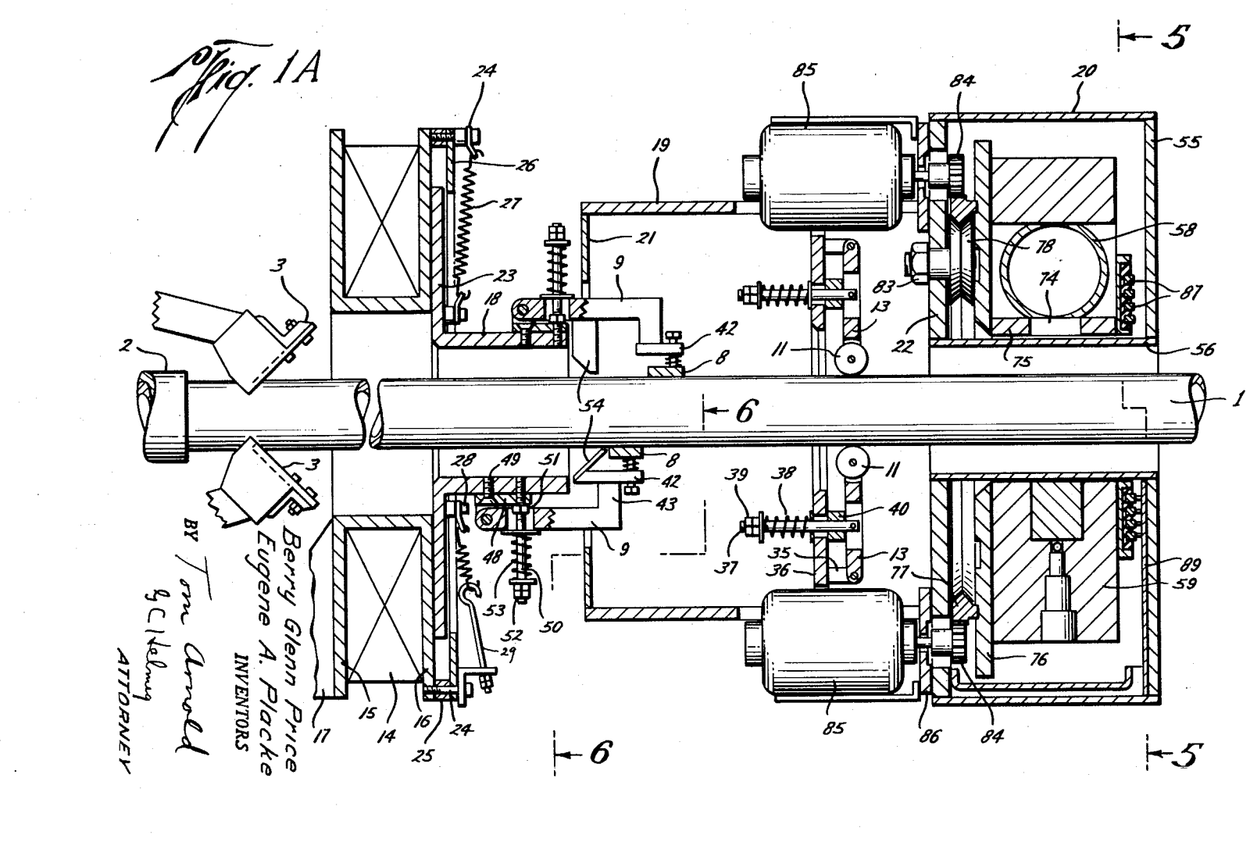
FIG. 1A is a longitudinal sectional view of an annular machine showing testing equipment in operative relation, the illustrated tubing to be considered as traveling through the machine from left to right and also showing fragments of cleaning scrapers positioned in advance of the testing equipment.
Figure 1B:
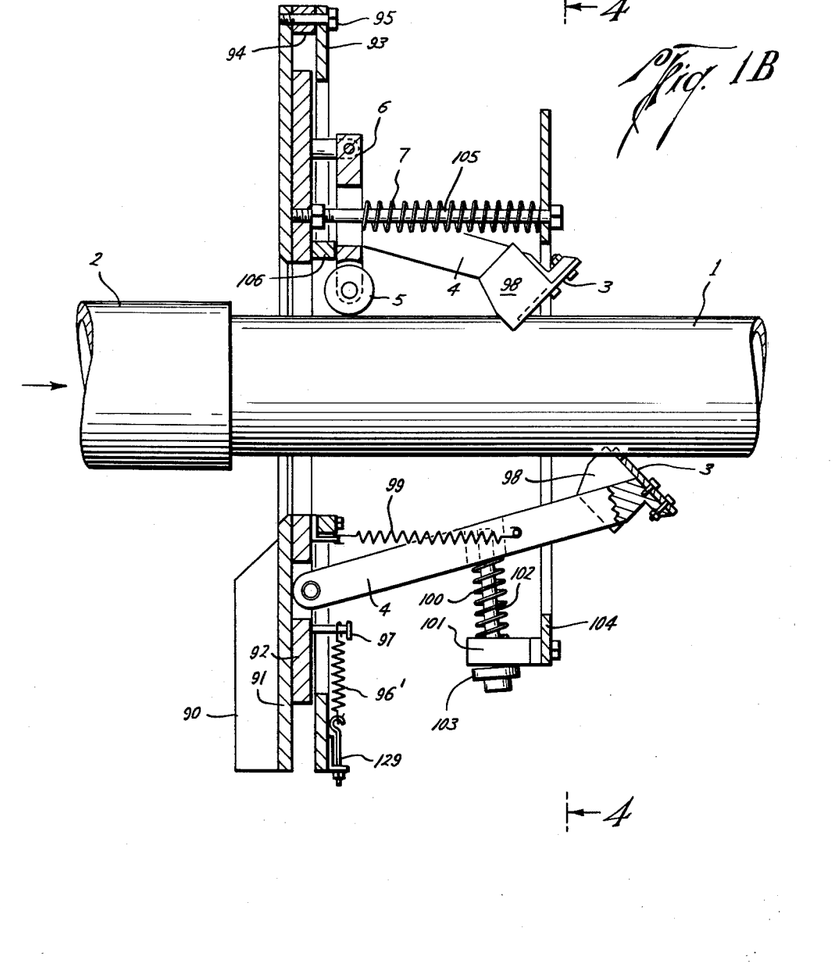
FIG. 1B is a longitudinal section of the scraper mechanism on a slightly larger scale and on line 1B—1B of FIG. 4.
Figure 2:
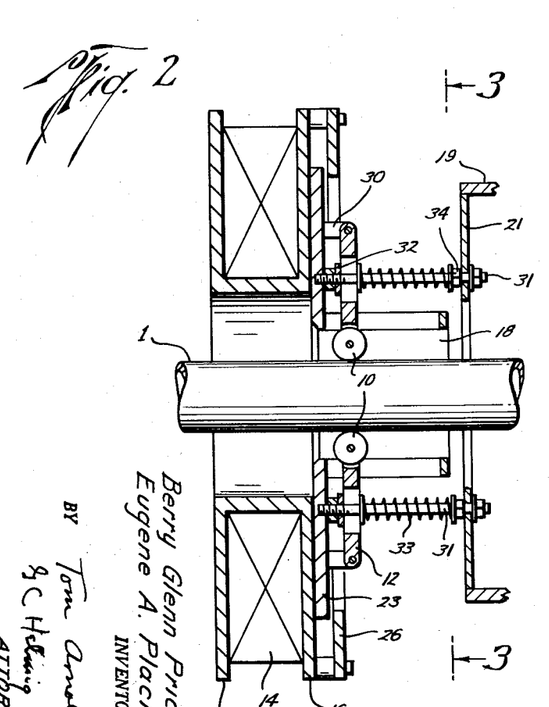
FIG. 2 is a longitudinal section angularly related to FIG. 1A at the forward end of the machine and on line 2—2 of FIG. 3.
Figure 4:
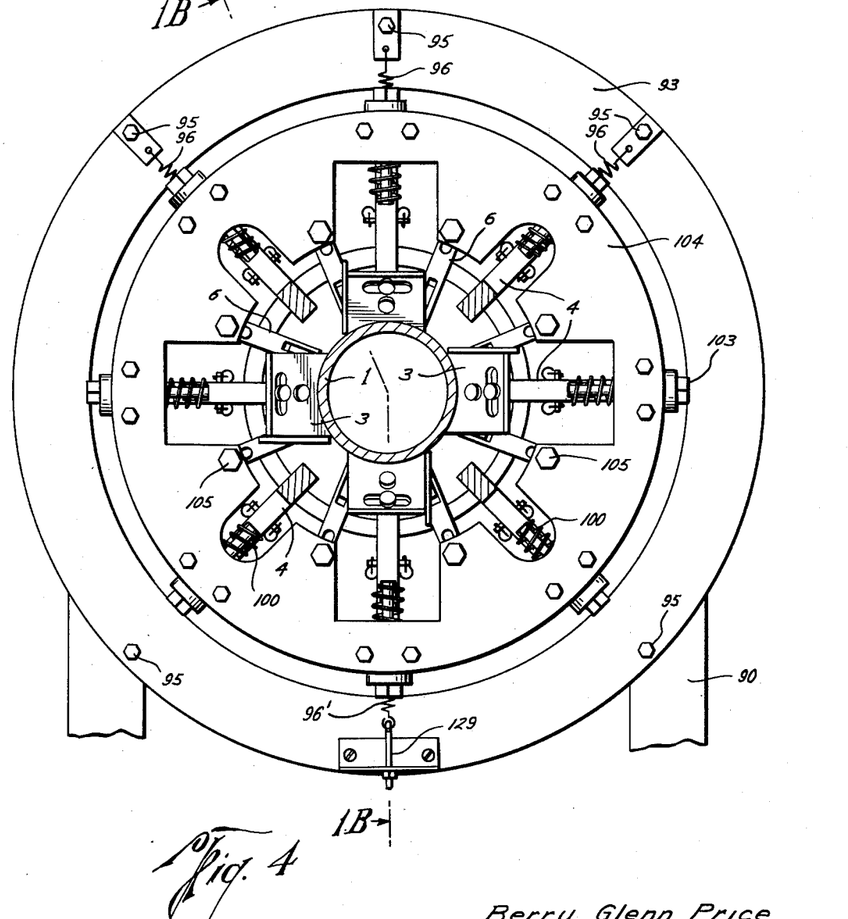
FIG. 4 is a transverse section on line 4—4 of FIG. 1B.

While for some situations the machine illustrated in the drawings is suitable for encircling and traveling longitudinally on stationary tubing, the following description will treat the installation as one in which tubing is conveyed horizontally through the machine from left to right, as viewed in FIG. 1A. Well tubing, as shown by the reference character 1, is generally of uniform outside diameter except for occasional external enlargements 2 inclusive of projecting lugs, upset wall portions and coupling joints or collars and those parts of the machine which bear or ride on the tubing are mounted for radial expansion to accommodate passage of tubing enlargements. Thus, wall follower scraper blades 3, arranged in circularly spaced apart relation around the tubing and in two longitudinally spaced sets, are mounted each on a free end of an inwardly spring biased lever 4, whereby the blades of each set will drag or wipe on the tubing wall but will spread or swing out to follow tubing irregularities. Likewise a set of centering guides or tube follower rolls 5 for the floating frame which carries the scraper levers 4 (see FIGS. 1B and 4) are radially expansible relative to one another by being journaled in levers 6 whose outward swinging action is yieldably resisted by coil springs 7. Two longitudinally spaced apart sets of circularly spaced detector coil shoes 8 are expansibly mounted on levers 9 as wall surface followers and there are two sets of frame centering rolls 10 and 11 (see FIGS. 2 and 1A) normally positioned in inwardly contracted relation on the ends of rearwardly and outwardly swingable lever arms 12 and 13.

The annular main frame for supporting the operating components and for receiving the traveling tubing centrally thereof is constructed according to FIG. 1A, of two subassemblies joined together in end to end succession in a manner that one thereof is floated or laterally shiftably suspended by the other frame subassembly, which itself is rounded or secured to a supporting stand or platform. Advantageously, the grounded subassembly is utilized to carry and house an annular magnetizing coil 14 and comprises a narrow channel section ring having forward and rearward radial end plates 15 and 16. Attachment brackets 17 on the forward plate 15 will mount the subassembly solidly to a work table or stand and in alignment with a pipe conveyor line for the performance of work on horizontally traveling tubing. The brackets 17 can also be considered as for use in anchoring the assembly to a well drilling platform floor when tubing travel is vertical in a well hole.

The laterally shiftable frame subassembly or component supporting chassis is an axially elongated hollow barrel made up primarily of a relatively small diameter cylindrical member 18 and a larger diameter cylindrical member 19 plus a still larger cylindrical member 20, all in longitudinal succession, together with radially disposed flat connector rings 21 and 22 extended inwardly from and preferably detachably joined, as by screw threads, coupling studs or the like, with the forward ends of the cylinders 19 and 20 respectively. At its forward end the smaller diameter cylinder 18 has welded or otherwise secured thereto, an outwardly projected annular mounting flange 23 whose front flat face slidably bears on the adjacent rearward face of the grounded subassembly plate 16. At its periphery the plate 16 carries a circular series of rearwardly projecting studs 24 spaced outwardly from the rim of the shiftably mounted flange 23 whereby to provide limit stops for a desired range of relative lateral displacement. Mounted on the studs 24 are spacer sleeves 25 and a keeper ring 26 to overlap and co-operate with the rearward face of the shiftable flange 23 in positioning and retaining the flange and its rearwardly elongated frame subassembly in suspended relation with the grounded frame subassembly.

Figure 3:
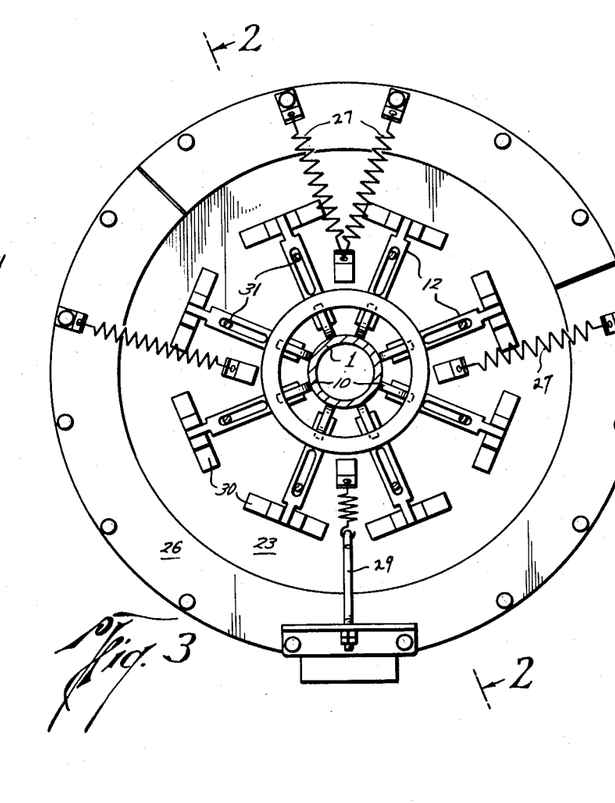
FIG. 3 is a transverse section on line 3—3 of FIG. 2.

For resiliently and yieldably allowing the laterally shiftable floating frame to follow the center position, a series of outwardly radiating tension coil springs 27 (see FIG. 3) are fastened at opposite ends to brackets secured respectively to the studs 24 carried by the plate 16 and to pins 28 carried by the shiftable flange 23. In the case of a horizontal machine, the uppermost pair of tensioning springs are both joined to the frame top, as seen in FIG. 3, for better supporting the load of the shiftable frame so that distribution of spring location and stiffness favors the top side. All but one of the springs are located generally above the horizontal center line and a single lower spring is relatively light and is secured to an adjustable anchor stud 29 by which loading force can be set for an initial centering relation.

As seen in FIG. 3, the lever arms 12 carrying the tube engaging or follower guide rolls 10 and projecting through longitudinal slots in the cylindrical frame member 18 are outwardly hinged on transverse pivot pins to brackets 30 on the shiftable flange 23 and extend perpendicular or normal to the tubing axis so as to transmit lateral tubing displacement directly in line with the pivot axis and without imposition on the levers of a directional force which would tend to swing them backwardly and outwardly. Hence the tubing cannot move away from the opposing rollers but remains in close fitment to all rollers and the frame follows and stays with the tubing in all radial directions and through quick direction reversals. A group of spacing and coupling studs 31 are arranged to extend longitudinally between the flange 23 and the frame ring 21 and pass through slots intermediate the ends of the lever arms 12. Each stud 31 at its forward end is threaded into the flange or plate 23 and carries a spacer sleeve or disk 32 forwardly of the lever arm 12 as a forward lever positioning stop. A coiled compression spring 33 surrounds each stud 31 and yieldably engages the back face of the lever 12 to hold the lever perpendicular to the tube axis and against its stop 32. At its rearward end the coil spring 33 bottoms against a washer and co-operating nuts 34 threaded on the rearward end of the stud 31 and the nuts clamp between them the frame flange 21. Consequently the flanges 21 and 23 are fixedly coupled by the several studs 31. In the event of passage through the machine of a coupling enlargement, such as shown at 2, the latter, upon contact with the follower rolls 10, will push the rolls rearwardly and swing the hinged lever arms 12 against the resisting coil springs 33 for the outward expansion of the rolls from one another, with the elastic force of the springs 33 continuing to maintain close contact of the rolls with the traveling tube and a centered relation of the shiftable frame to the tubing. Immediately the enlargement travels beyond the rollers, the spring contractive force restores all lever arms to positions normal to the tubing axis.

To afford ample support for the rearwardly extended floating frame, there are provided in longitudinally spaced relation with the rollers 10 and mounting levers 12, additional follower rollers 11 and mounting levers 13 arranged in circularly spaced apart relation. This set of lever arms 13 have transverse hinge pin connections on transverse axes through brackets 35 on a transverse mounting plate or ring 36 peripherally welded to the inside of the cylindrical frame member 19. From each lever arm 13 a stud 37 projects through the ring 36 forwardly thereof and carries a compression coil spring 38 bearing at opposite ends on the ring and on terminal adjusting and locking nuts 39 on the stud 37. This coil spring 38 yieldably holds the lever arm 13 radially or perpendicular to the tubing axis and against a stop sleeve 40 surrounding the stud and bearing on the rear face of the plate 36. This follower action on the tubing and tubing enlargements is the same as that of the rolls 10. Eight rolls angularly spaced forty-five degrees apart in each of the longitudinally spaced apart sets 10 and 11 will insure a proper follow-up action and peripherally the rolls of one set are preferably staggered or longitudinally offset from alignment with those of the other set.

The tubing bearing shoes 8 contain pick-up coils for the detection of magnetism induced in the tubing wall surface as it passes through the coil 14 and whose intensity, read or recorded on a meter, indicates the presence or absence of surface flaws such as cracks or scoring in the tubing wall. These shoes are mounted in two sets longitudinally spaced apart and their inwardly disposed bearing faces are arcuate in shape in conformity with the tubing peripheral surface. Each set consists of eight circularly spaced apart detector shoes and each shoe is of an arcuate length slightly exceeding the gap or space between adjoining shoes. By staggering the shoes of one set in relation to those of the other set, the intervening gaps between the shoes of one set are aligned with the shoes in the other set and the entire tubing circumference is covered by the two co-operating sets of shoes. For a cushioning effect, each detector shoe is resiliently mounted on the head 42 of an inwardly extending leg 43 at the free end of its longitudinally projected lever arm 9. A pair of guide pins 44 (see FIG. 7) are fixed on the head 42 and project slidably through guide openings in the shoe 8 and a coil spring 45 interposed between the head 42 and the shoe 8 yieldably resists outward shoe displacement. A headed stud 46 extends through the head 42 and through the spring to locate the latter and is threaded into the shoe 8. A spacer sleeve 47 is interposed between the head of the stud 46 and the rear face of the shoe and has slide bearing in the head 42 upon deflection of the spring 45. The head of the stud 46 co-operates with the head 42 of the lever to limit spring expansion.

Each lever arm 9 extends longitudinally forward from its free end and is hinged on a transverse axis to a mounting strap 48 secured to the cylindrical framing member 18 by a screw stud 49. Rearwardly of the fastening stud 49, an outwardly projecting radial stud 50 threaded into the frame member 18 has a nut 51 to bear on the hinge strap 48 and assist in its attachment. This stud 50 projects through an elongated opening in the lever arm 9 and terminally carries adjusting and locking nuts 52 for grounding one end of a coil compression spring 53 which surrounds the stud and bears inwardly on the lever arm 9. The several inwardly spring biased lever arms 9 tend to maintain the detector coil containing shoes 8 inwardly contracted but yield readily for outward expansion of the shoes to fit tubing surface irregularities. For protection of the cushioned shoes 8 from longitudinal blows, each lever arm has an advance of its shoe an inwardly extended striker plate 54 with a forwardly and outwardly inclined caming face with which any tubing enlargement 2 makes a slide contact as it begins passage through the shoes.

Figure 5:
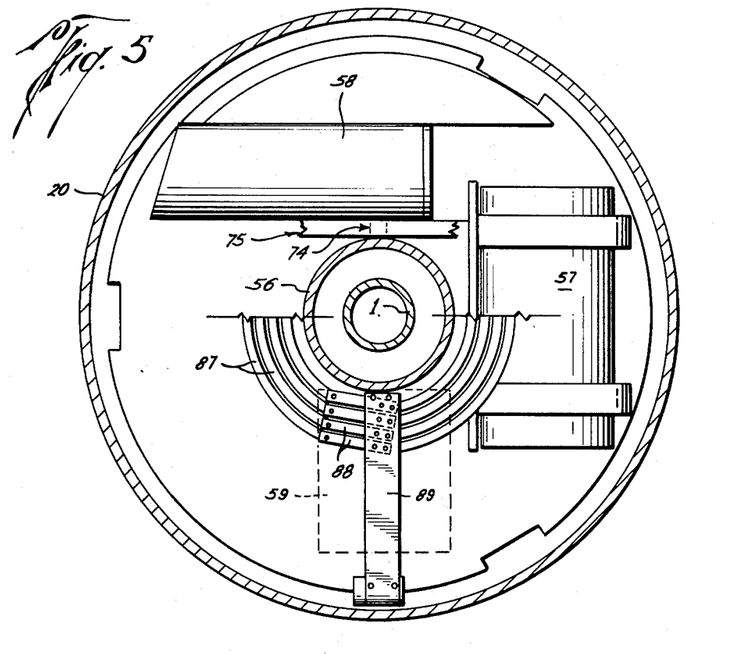
FIGS. 5 and 6 are views taken on lines 5—5 and 6—6 of FIG. 1A.
Figure 6:
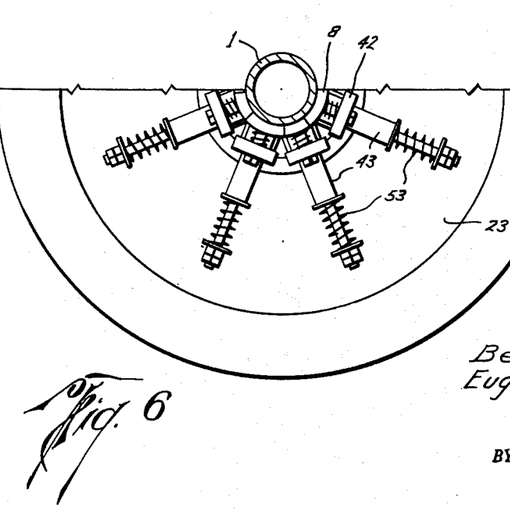

At the rearward end of the shiftable frame assembly and housed within the annular space enclosed by the cylindrical member 20 and transverse ring 22 together with an end cover plate 55 and a central tubular wall 56, are operating parts of a wall thickness measuring mechanism. Such parts, as seen in FIG. 5, include an amplifier package 57 and a pair of diametrically oppositely disposed units comprising a radiation sensing device 58 and a ray emitting device 59 from which rays are directed to intersect the path of tubing travel and for reception by the sensing device 58. Such units are commonly used for harnessing gamma rays in wall thickness measuring instruments and for converting radiation energy into electric signals to be metered.

Figures 7, 9:
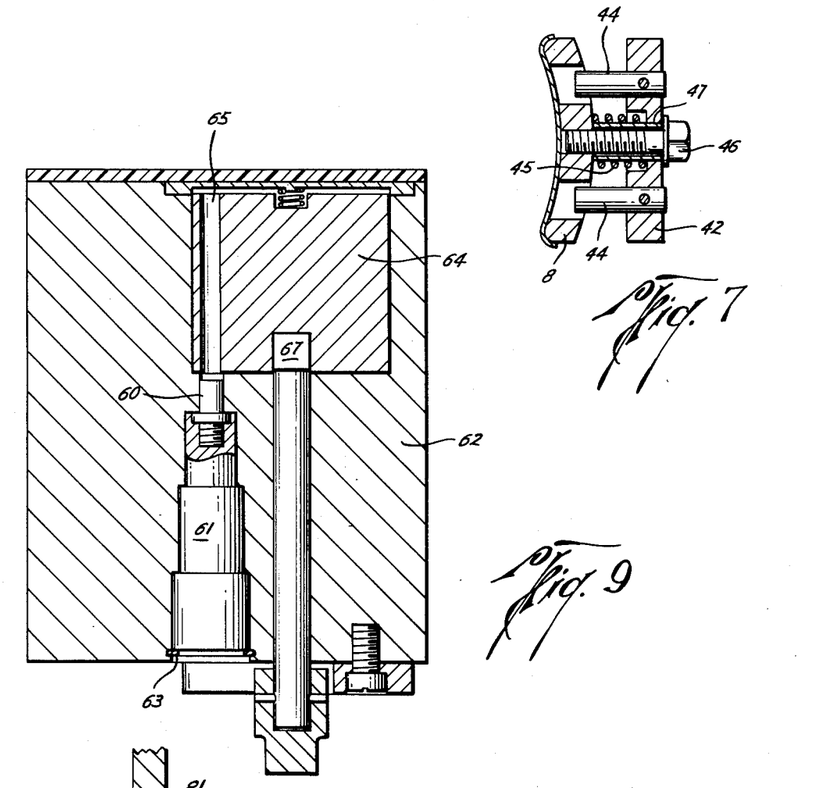
FIG. 7 is a detail section of a mounting of a magnetic detector or signal pickup shoe.
FIG. 9 is a section on line 9—9 of FIG. 11.
Figures 8, 10, 11:
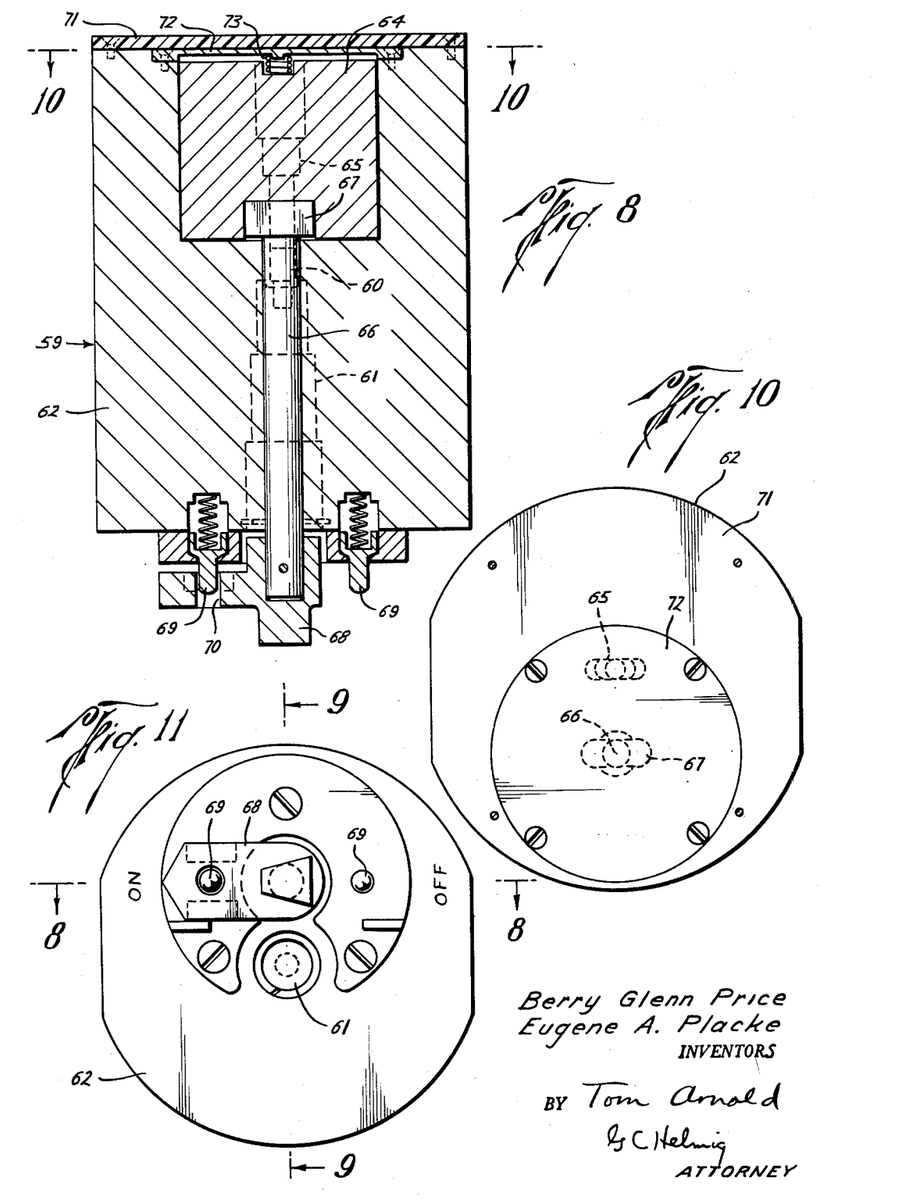
FIG. 8 is an enlarged section on line 8—8 of FIG. 11 and shows the mounting of the controls for a gamma ray emitter.
FIG. 10 is an end elevation as on line 10—10 of FIG. 8.
FIG. 11 is an elevation at the outer end of the control and container for the radiation source.

By reference to FIGS. 8–10, it will be noted that the ray emitting unit 59 includes a small element 60 constituting the radiation source and which is mounted at the inner end of a shouldered plug 61 removably fitted within a housing block 62. Both the plug 61 and its receiver bore have stepped diameter portions closely mated to one another to avoid straight line leakage paths outwardly from the source and between the plug 61 and the housing 62. A snap ring 63 fitted to an internal groove at the outer end of the bore overlaps the outer shoulder on the plug 61 to hold the same in place. An outwardly projecting terminal lug on the plug 61 may have a screw driver slot and/or wrench engageable side flats for rotationally adjusting the plug. In the end portion of the housing block 62 ahead of the radiation source 60, there is a cylindrical pocket or opening whose axis is parallel to but laterally offset from the plug receiving bore and received by and rotatable within this cylindrical and inwardly disposed pocket is a circular switch or shutter plug 64. Radially offset from its rotational axis a distance corresponding to the radially offset relation of the radiation source, the rotary plug 64 has an opening 65 extending in parallelism with the axis and being relatively narrow in the radial direction but increasing in width in steps away from the source, as shown by broken lines in FIG. 8. The rotary plug is therefore a shutter whose opening 65 can be rotated into and out of alignment with the source 60 for controlling the passage of rays therefrom.

An operating shaft 66 extends through an opening in the housing 62 in axial alignment with the plug 64. At its inner end, the shaft 66 has a transversely elongated key 67 to fit into a key slot in the plug 64 for the unisonal rotation of the parts. At its outer end, the shaft 66 has pinned thereto a control lever or hand knob 68 by which rotation is manually imparted to the switch plug 64. A pair of spring pressed poppets 69 are carried at the outer end face of the housing 62 for selective snap-in co-operation with an opening 70 in the control knob for retaining the latter in either an "off" or an "on" position. A projecting tip on the knob 68 may have opposite side flats for wrench engagement. The inner face of the housing 62 is overlaid by a cover plate 71 of Lucite or the like and beneath the Lucite plate 71 is a small stainless steel plate 72 secured within a counterbored recess in the housing end face. A coil spring 73 is interposed between the stainless steel plate 72 and the rotatable shutter plug 64 in line with the axis of the control shaft. Spring pressure acts in the same direction as centrifugal force upon unit rotation to hold the rotary plug 64 snug against the bottom of its enclosing pocket in the housing 62. The stainless steel cover plate 62 has an aperture in alignment with the radially offset passage 65 which is directed radially toward and intersects the axis of the travel path of the tubing wall to be tested. Diametrically opposite from the radiation source 60 and overlying the radiation sensing device 58 is a rectangular opening 74 in a lead plate 75 for passing wall penetrating rays into the device.

The wall thickness measuring components 57, 58 and 59 are mounted for rotation about the center of the tubing travel path by their securement to the rear face of a rotor ring 76 having fixedly attached and projected forwardly from its front face a mounting and externally toothed ring gear 77. Internally the ring gear 77, as seen in FIG. 1A, is of V-shape in section to provide a pair of inwardly convergent side faces angularly related at about forty-five degrees from a transverse radial plane through the machine. The convergent faces fit within and ride on mating V-shaped rims of a series of equally spaced apart wheels 78. These wheels or at least the bearing surfaces thereof, are formed of wear resistant nylon and the use of a set of about six wheels will firmly locate the rotary assembly for smooth rotation in a fixed path.

Figure 12:
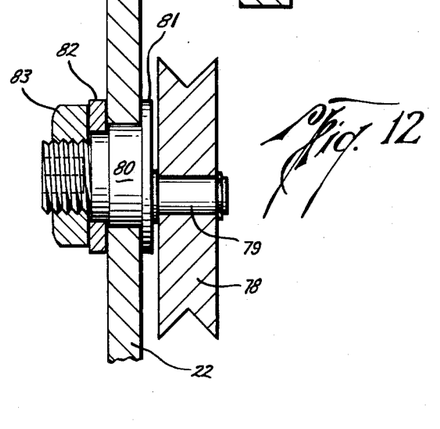
FIG. 12 is a detail fragmentary view of a centering adjustment for the roller supports of the rotatable gamma ray mechanism.

For relative radial adjustment of the axes of the several wheels and for a good running fit to the ring gear and for centering the rotary assembly, each wheel hub is journaled on a crank pin 79 of a short trunnion shaft 80 which extends through and is rotatable within an opening in the chassis frame plate 22 for adjustable settings on an axis eccentric to the pin 79. As shown in FIG. 12, an annular flange 81 integral with the shaft 80 and a washer 82 engage opposite faces of the mounting plate 22 and in co-operation with a nut 83 threaded on the shaft, clamp the shaft in fixed positions of angular adjustment. The projected shaft end has an internal polygonal socket or hollow portion for removable reception of an Allen wrench by which the shaft 80 can be turned in radially shifting the wheel axle 79 during fitment to and a centralizing setting of the ring gear and can maintain the adjusted position while the clamp nut 83 is being drawn tight to lock the trunnion to its support. Such wheel mounting provides vernier calibration of settings on indivdual wheels and the relative settings co-operate for properly centering the driven rotor assembly.

In drive transmitting engagement with the external teeth of the ring gear 77 are drive pinions 84 driven by one or more electric motors 85. It is proposed to employ four small motors equally circularly spaced apart and mounted on parallel longitudinal axes by a ring 86 bolted on the forward face of the frame plate 22 and through which the motor drive shaft extends. Preferably, such mountings should provide a limited range of lateral motor adjustment to facilitate fitment of their pinions to the ring gear.

Commutator rings 87 are carried on the rear face of the rotary assembly and one or more co-operating sets of contact brushes 88 are positioned by radial arms 89 fixed in the rotor enclosing box and engaged with the commutator rings, for enabling inclusion of the revolving parts in the usual metering circuitry.

For performing testing operations on clean tubing, the scraper shoes 3 can be dispensed with. When they are employed for cleaning or conditioning purposes, they are placed ahead of the testing equipment and can be supported either by the previously described floating frame assembly through suitable forwardly projected frame extensions or alternately by a self contained laterally shiftable unit assembly, as conveniently shown in FIGS. 1B and 4. Grounding brackets 90 fixedly locate an annular mounting ring or centrally apertured plate 91 surrounding the tubing travel path and laterally shiftably supporting a framing subassembly for the scraper blades. The slide frame includes a ring 92 having face to face slide bearing on the annular plate 91 and retained thereon by peripheral fitment within an internal annular pocket afforded by a retainer ring 93 fixedly located by spacer sleeves 94 and fastening studs 95 projecting through the sleeves into screw threaded attachment with the rim of the fixed annular plate 91. A series of radially disposed coil springs 96 above the slide plate center, are secured at opposite ends to pins 97 on the slide plate 92 and to brackets held under the heads of the fastening studs 95 and act under tension to suspend and center the shiftable frame plate 92 and accommodate relative lateral displacement thereof. A single lower coil spring 96' is joined at opposite ends to one of the studs 97 and an adjustable stud 129 carried by the fixed plate 91 and is loaded to co-operate with the suspension spring 96 for initially centering the shiftable plate 92.

Alternately disposed long and short lever arms 4 are pivoted on transverse pins to the shiftable frame plate 92 and extend in a general longitudinal direction toward their free ends. At the free end of each arm 4, there is a striker block 98 having an inwardly and rearwardly inclined camming face for engagement with any passing tube enlargement 2 for outward displacement of the scraper blade. Each scraper blade 3 is replaceably bolted and has a limited swing adjustment on the free end of the lever 4 for positioning an inwardly disposed arcuate or segmental cutting edge to conform with and to engage and follow the tubing surface as a scraper knife. Because of the alternately long and short lever arms, the surface cleaning scrapers are in two longitudinally spaced apart groups of circularly spaced apart scrapers with those of one set longitudinally staggered from those of the other set. The arcuate circular segmental length of each scraper edge exceeds the gap between its neighboring scrapers so that the staggered or offset disposition of the forward and rearward sets enables the entire tubing circumference to be cleaned in readiness for test performance thereon.

Each lever 4 is biased inwardly through the use of either or both a tension spring 99 and a compression spring 100. The tension coil spring 99 is inside the lever arm and has opposite ends anchored one to the lever arm and the other to a bracket on the slide frame plate 92. The compression coil spring 100 is outside the lever arm and bears at opposite ends on the lever arm and a lug 101 and fits around a pin 102 pivoted at one end on the lever 4 and slidably projected outwardly through the guide lug 101. A head and washer 103 at the outer end of the pin 102 by engagement with the lug 101 limits inward contraction of the lever arm 4. The mounting lug 101 is secured by bolts to a locating ring or annular plate 104 which is secured rearwardly of and as a unit with the laterally shiftable framing member 92. The connection is by means of long studs 105 which correspond in number and location to the centering lever arms 6 and pass through slots therein. The coiled compression spring 7 surrounds the stud and has opposite ends bearing on the plate 104 and the lever arm 6 and the spring yieldably maintains the lever arm 6 against a limit stop 106 on the plate 92 and thus positions the lever arm to extend normal to the tube travel path. Expansion of the lever arm 6 for passing tubing enlargement is by rearward swing of the lever arm against the compression force of its spring 7.

The foregoing specification has described in detail a preferred embodiment of a machine wherein there is provided a supporting chassis frame for work performing components whose action is on tubing during relative longitudinal travel and wherein the chassis is floatingly mounted and centered to follow lateral displacement of the tubing but it is to be understood that modifications of the structure can be made without departing from the spirit of the invention as set forth in the appended claims.

What is claimed is:

1. Mechanism to co-operate with the periphery of a tubular work object for the performance of an operation during relative longitudinal travel of the work and the mechanism, comprising a support, elastic means laterally shiftably mounting said support said means including a bearing surface, work engaging and follower guides carried by the support to center the same in relation with the work as accommodated by said elastic means, work performing and surface engageable followers laterally shiftably mounted on the shiftable support and spring means active on said followers to bias the same toward work engaging positions in all lateral positions of the shiftable support and yieldable to enable the work surface engageable followers to follow work surface irregularities.

2. Work performing mechanism of the character described, including a circular supporting member having an opening therethrough to receive a tubular object to be operated upon during relative travel longitudinally of the tubular object, a series of circularly spaced object engageable guides laterally shiftably mounted on said supporting member, spring means biasing said guides inwardly, means resiliently mounting said supporting member for displacement under lateral forces transmitted thereto through said series of guides said means including a bearing surface, a series of working elements adapted to have drag bearing on a tubular object received within the supporting member, lever arms positioning said working elements and extending longitudinally therefrom, pivotal connections joining the lever arms to said supporting member and accommodating their relative expansion and contraction and spring means exerting yieldable contractive force on the levers.

3. Work performing mechanism of the character described, including an annular support to surround a work piece, a series of magnetic detectors adapted to have slide contact with a work piece, resilient mounting means connecting said detectors with the annular support and yieldably urging the detectors radially inwardly, radially outwardly yieldable guides carried by the annular support and adapted to track on a work piece contacted by said detectors and means yieldably mounting said support for lateral displacement under force transmitted thereto through said guides.

4. Work performing mechanism of the character described, an annular support to surround an elongated work piece during relative travel therebetween and longitudinally of the work piece, means resiliently mounting said support to partake of work piece lateral displacement, a circular group of work piece centering and guiding elements resiliently carried by the support to follow surface irregularities on the work piece and to co-operate with one another in transmitting work piece bodily displacement laterally to the annular support, a series of lever arms each pivotally connected at one end on the annular support, spring means active on the lever arms to bias their opposite ends radially inwardly and scraper knives carried by said opposite ends of the levers for work piece surface scraping engagement.

5. The structure of claim 4 wherein the scraper knives are arranged in longitudinally spaced apart sets with the knives of each set being circular segments circularly spaced apart distances less than their segmental lengths and with those of one set longitudinally staggered in relation to those of another set.

6. Mechanism of the character described, a support frame having an opening therethrough for the reception and relative travel of an elongated work piece, longitudinally spaced apart centering and guiding devices carried by the support frame for engagement with a work piece, means resiliently mounting the support frame for lateral bodily displacement under force transmitted thereto through said centering and guiding devices, a magnetizing coil connected with the support frame and magnetism detector shoes carried by the frame for engagement with a work piece in longitudinally spaced relation with said coil and resilient means accommodating relative lateral expansive movement of the shoes for fitting their work piece engagement to radial surface offsets.

7. Means to operate on longitudinally traveling pipe, including a frame through which traveling pipe is to be passed, two sets of longitudinally spaced apart centering guides carried by the frame for pipe tracking engagement, frame mounting means locating the frame longitudinally and accommodating lateral shift of the frame under force transmitted through the longitudinally spaced apart guides upon lateral pipe displacement, a pair of work performing assemblies carried by the frame in longitudinally spaced apart relation for co-operation with a traveling pipe in the performance of working operations, one of said assemblies comprising a set of radially expansible pipe engaging followers and the other of said assemblies comprising a rotor, means attaching the rotor to the frame for rotation about an axis parallel with the direction of pipe travel through the frame, a source of radiation carried by the rotor and positioned thereby to direct rays to intersect the path of pipe travel, a ray detector carried by the rotor to receive rays projected from said source and drive means coupled to the rotor to effect its rotation.

8. The structure of claim 7 wherein each set of centering guides comprises a series of circularly spaced apart and inwardly biased pipe engaged members which are radially expansible in maintaining a centering action on pipe containing diametrical variations.

9. The structure of claim 7 wherein each set of centering guides comprises a number of radial arms which normally extend perpendicular to the path of pipe travel, pipe engaging rollers carried by the inner ends of the arms, hinge connections joining the outer ends of the arms to the frame and permitting displacement of the arms in the direction of pipe travel for passage of pipe enlargements through said rollers and spring means yieldably resisting arm displacement.

10. The structure of claim 7 together with an induction coil carried by the frame in proximity to the pipe travel path for magnetizing the wall of a pipe traveling past the same and wherein said radially expansible pipe engaging followers comprise circularly spaced apart lever arms, each pivoted to the frame at one end and terminated at its free end in a magnetism intensity detecting shoe.

11. Testing equipment to detect surface flaws and wall thickness in tubing to be passaged longitudinally therethrough, including a component locating frame of two subassemblies one of which is a mounting member securing the frame in operative position, connections shiftably supporting the other frame subassembly on the mounting member for relative movement in a direction normal to the direction of longitudinal tube travel therethrough, a pair of longitudinally spaced apart tubing engageable centering guides carried by the shiftable frame subassembly for co-operation with said shiftable support connections in maintaining the shiftable frame subassembly in centered relation to tubing passing therethrough, a frame carried tubing magnetizing device, a series of magnetism detecting and tube engageable shoes, means movably mounting said shoes on the shiftable subassembly adjacent the magnetizing device and for their relative radial expansion to follow tubing surface irregularities, a ring rotatably mounted by the shiftable subassembly for travel in a circuit surrounding the path of tubing travel, a ray detector and a co-operating source of radiation positioned by said ring on opposite sides of said path of tube travel and a drive motor mounted by the shiftable frame subassembly in drive transmitting relation to the rotatable ring.

12. Testing equipment for tubing to be passaged longitudinally therethrough, including a frame subassembly, a support mounting said frame subassembly for lateral shifting movement, tubing engageable centering guides carried by the frame subassembly for transmitting thereto lateral tubing displacement and for shifting the frame subassembly relative to its support during tubing passage, a rotor ring on the frame subassembly in encircling relation to the path of tubing travel, drive means carried by the frame subassembly in drive connection with the rotor to impart rotation thereto, a source of radiation rotatable with the rotor ring and positioned thereby to intersect said path of tubing travel and a ray detector carried by the rotor ring for receiving rays from said source.

13. Testing equipment as described in claim 12 wherein the rotor ring has an annular mounting member at one side thereof and a number of supporting wheels are carried by the frame subassembly for tracking engagement by said annular member and at least one of said wheels is radially adjustably secured to said assembled frame for setting the tracking fit of the wheels and annular member.

14. Testing equipment for tubing to be passaged longitudinally therethrough, a ray detector and a source of radiation to be focused thereon, a rotor having a central opening for tube passage therethrough and mounting said detector and said source on substantially diametrically opposite sides of said opening, a ring gear secured to and projected from one lateral face of the rotor, the external and internal surfaces of said ring gear having drive teeth on one thereof and convergent tracking faces on the other thereof, a support frame having a series of circularly spaced apart wheels with convergent peripheral faces in mating direct relation with the tracking faces of the ring gear and a drive motor carried by the frame and provided with a drive pinion in mesh with drive teeth on said ring gear.

15. Testing equipment for tubing to be passaged longitudinally therethrough, a ray detector and a source of radiation to be focused thereon, a rotor having a central opening for tube passage therethrough and mounting said detector and said source on substantially diametrically opposite sides of said opening, a ring gear secured to and projected from one lateral face of the rotor, the external and internal surfaces of said ring gear having drive teeth on one thereof and convergent tracking faces on the other thereof, a rotor support member, a drive member mounted on the support member, a motor driven pinion in mesh with the teeth of said ring gear, a plurality of circularly spaced apart wheels having convergent faces in support bearing relation with said tracking faces, a series of wheel adjustable supporting cranks, each having a wheel bearing pin and a trunnion mounted for rotational adjustment in the support member and means to lock said trunnion in selected positions of fixed adjustment.

16. A holder and control for a gamma ray source, including a rotary switch plug having a ray transmitting passage extended in substantial parallelism with and radially spaced from the rotational axis thereof, a mounting block having in one end portion thereof a cylindrical opening enclosing and rotatably supporting said rotary plug and also having a shouldered bore projected from said opening through the other end portion of the plug in substantial parallelism with and radially spaced from the axis of said cylindrical opening a distance corresponding with the spacing of said ray transmitting passage from the plug axis, said shouldered bore being of diameters increasing in steps in the direction away from said opening, a stepped diameter plug closely fitted to and removably positioned in said opening, a radiation source carried by the innermost end of said stepped diameter plug and a rotary control shaft projected through said block in axial alignment with and connected to said switch plug for turning the same to and from a position in which said ray transmitting passage is aligned with the radiation source.

References Cited in the file of this patent

UNITED STATES PATENTS

| | | |
|---|---|---|
| 890,085 | McCann et al. | June 9, 1908 |
| 1,933,547 | Drake et al. | Nov. 7, 1933 |
| 2,135,675 | Palmer | Nov. 8, 1938 |
| 2,813,285 | Asline et al. | Nov. 19, 1957 |
| 2,878,446 | Price et al. | Mar. 17, 1959 |
| 2,878,447 | Price et al. | Mar. 17, 1959 |
| 2,881,386 | Price et al. | Apr. 7, 1959 |
| 2,886,772 | Gresham et al. | May 12, 1959 |